Dec. 12, 1944.   R. R. BEDDOW   2,364,598
PICKUP DEVICE FOR AIRPLANES
Filed Aug. 31, 1943
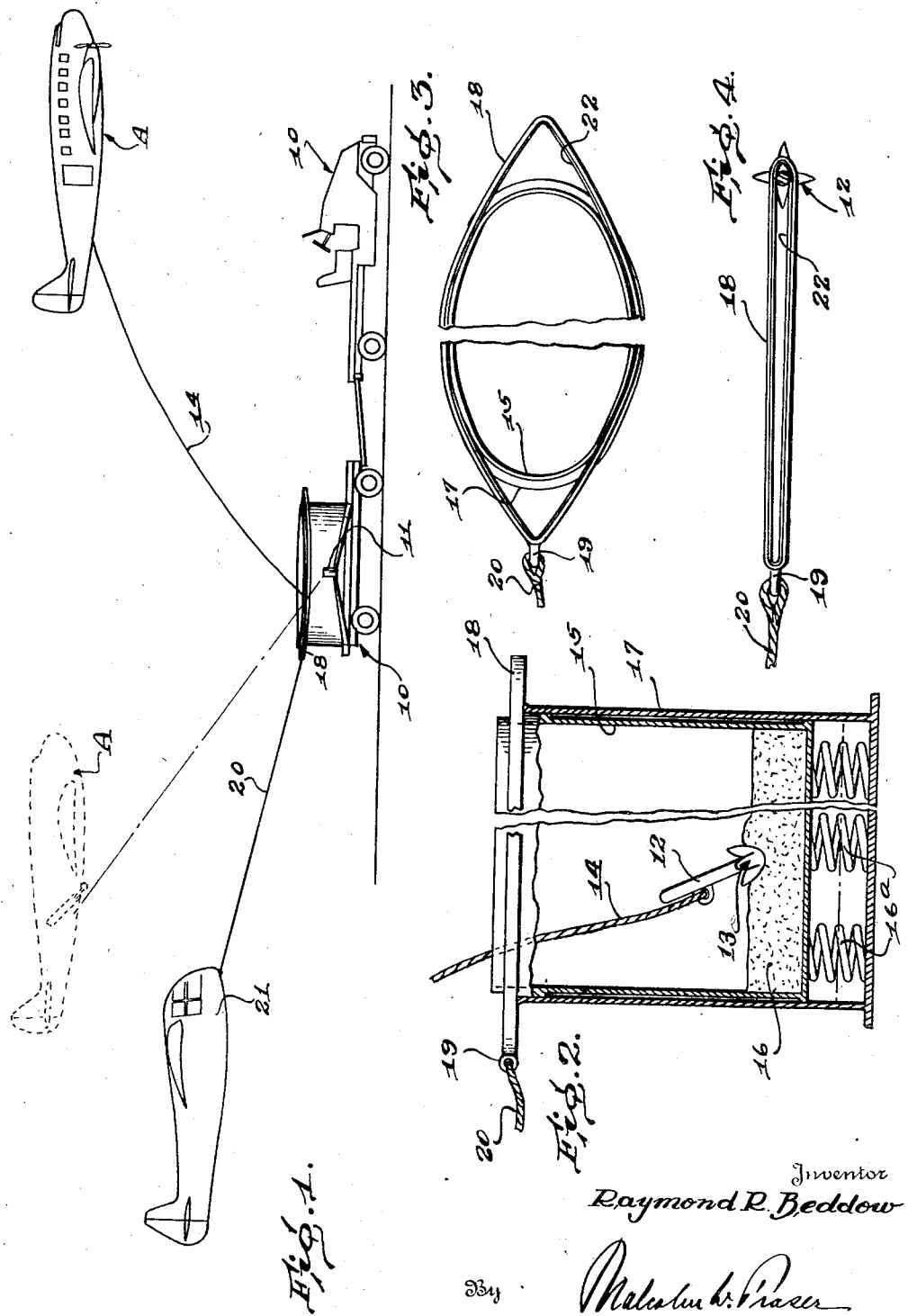
Inventor
Raymond R. Beddow
By Malcolm W. Fraser
Attorney

Patented Dec. 12, 1944

2,364,598

UNITED STATES PATENT OFFICE 2,364,598

PICKUP DEVICE FOR AIRPLANES

Raymond R. Beddow, Toledo, Ohio

Application August 31, 1943, Serial No. 500,607

6 Claims. (Cl. 258—1.2)

This invention relates to pickup devices for aircraft in flight and an object is to produce a simple and efficient device of this character by which an airplane in flight can readily pick up objects from the ground such, for example, as gliders, mail sacks and packages.

Another object is to produce a pickup device of the above character by which a projectile is shot or dropped from the aircraft while in flight, the projectile being connected to the aircraft by a cable and a device receiving the projectile in such manner that the impact of the projectile automatically couples the projectile or its cable to the cable secured to the glider or other object to be towed or to be drawn into the aircraft.

Other objects and advantages of the invention will hereinafter appear and for purposes of illustration but not of limitation, an embodiment of the invention is shown in the accompanying drawing in which Figure 1 is a diagrammatic view showing the pickup device mounted on a truck, showing also the airplane first receiving a beam of light from the truck to energize the electric eye on the aircraft and then the aircraft in position just before the pickup device is coupled to the cable from the airplane;

Figure 2 is a view partly in vertical section of the telescoping receptacles and showing the projectile just prior to the time it is coupled with the spring band which in turn is connected to the article to be towed or picked up;

Figure 3 is a top plan view of the band and receptacles shown in Figure 2; and

Figure 4 is a view showing the spring band collapsed and engaging the cable secured to the projectile.

The illustrated embodiment of the invention comprises a truck hauled trailer 10 on which is mounted a device 11 for creating a beam of light to energize an electric eye (not shown) carried by the airplane A. In this case the beam of light is generated on the trailer but it should be arranged outwardly a sufficient distance from the pickup apparatus on the trailer so that the aircraft is required to fly over the trailer at a predetermined height. Therefore, it is necessary not only that the airplane A fly directly over the trailer 10 but also at a certain predetermined height above it before the electric eye on the aircraft will be energized. When the electric eye is energized, it operates, in any well-known manner, a suitable gun or discharging device to discharge the projectile 12 which, as shown, is provided with a hook 13. The projectile 12 is connected by a cable 14 to the airplane A such, for example, as to the drum of a power operated winch.

The projectile 12 is discharged into a receptacle 15 and its impact is absorbed by a suitable cushion 16, as, for example, sand in the bottom of the receptacle 15. Coil springs 16a are interposed between the bottom of the receptacle 15 and an outer receptacle 17 and are for the purpose of sustaining the weight of the receptacle 15 and the bed of sand. The receptacle 15 fits within or telescopes with the outer receptacle 17 and the bottom of the receptacle 15 is normally held in spaced relation from the bottom of the receptacle 17 by the coil springs 16a. A spring steel band 18 embraces the outer side of the receptable 15 near the upper end and rests upon the mouth or upper end of the outer receptacle 17 substantially as shown in Figure 2.

The spring band 18 has an eye 19 which in this instance, is connected by a cable 20 to a glider 21. However, it will be understood that the band 18 may be connected to any package or article to be towed by or delivered to the airplane A. Preferably the inside of the band 18 has a lining of cork or similar material 22 to militate against injury to the cable 14 when the band snaps to its collapsed position. Preferably the cables 14 and 20 have a certain amount of elasticity, cables of this character being presently in use.

Preferably the receptacles 15 and 17 are oval in cross section, or elongate in the direction of airplane flight. The band 18, upon separation from the receptacle 15, abruptly snaps to its collapsed or flatwise position shown on Figure 4. It will be understood that the force of the impact of the projectile 12 against the layer of sand 16 moves the receptacle 15 downwardly, forcing the band 18 from the upper end of the receptacle 15. Thereupon the band 18 snaps to its collapsed position, embracing the cable 20 and enabling the projectile to engage the band in crosswise fashion, thereby positively coupling the glider or object to be towed or picked up to the airplane A.

As shown in Figure 1, the truck drawn trailer 10 is in motion so that the glider 21 is likewise in motion and above the ground, thereby greatly facilitating the coupling of the parts. In some instances, however, it would be unnecessary for the pickup device to be in motion particularly in view of the great advancement made in sighting objects from an airplane in flight. It will also be understood that under some conditions, it may not be necessary forcefully to discharge the projectile from the airplane as the weight of the projectile would be sufficient, where the sights which are presently known and in use, can be employed for the purpose.

It is to be understood that numerous changes in details of construction, arrangement and operation may be effected without departing from the spirit of the invention especially as defined in the appended claims.

What I claim is:

1. A pickup device for aircraft comprising a pair of telescoping receptacles, a resilient band on the inner receptacle adjacent the mouth thereof, said band being adapted to be connected to the object to be picked up, said band being adapted to bear against the mouth of the outer receptacle and to snap into substantially flatwise condition upon being separated from the inner receptacle, means normally to hold the mouth of the inner receptacle in outwardly spaced relation to the mouth of the outer receptacle, and a projectile having a cable connection with the aircraft and being adapted to enter said inner receptacle to cause same to move downwardly and enable the band to slip therefrom and snap into coupling engagement.

2. A pickup device for aircraft comprising a pair of members fitting one within the other, means supporting one member in relation to the other to provide for relative movement of said members, a resilient band engaging the outer side of the inner member and being adapted to slip therefrom, said band being adapted to abut against said outer member and to snap into flatwise condition upon separation from said inner member, means to connect an article to be towed or picked up to said band, and means discharged from an aircraft in flight to cause relative movement of said members, said last means including a cable anchored to the aircraft and engageable by said band when in flatwise condition.

3. A pickup device as claimed in claim 2, in which said members comprise telescoping receptacles substantially oval in cross section with the larger diameter extending approximately in the direction of airplane flight.

4. A pickup device as claimed in claim 2 in which the aircraft discharge means comprises a weighted projectile and the band is of spring metal, and a lining is on the inside of said band to militate against injury to the projectile cable.

5. A pickup device as claimed in claim 2, comprising a cushion in the inner member to receive the impact of said projectile.

6. A pickup device as claimed in claim 2, in which said supporting means comprises resilient means between said receptacles for normally holding the bottom of the inner receptacle in spaced relation to the bottom of the outer receptacle.

RAYMOND R. BEDDOW.